United States Patent
Ferguson

(10) Patent No.: US 7,774,607 B2
(45) Date of Patent: Aug. 10, 2010

(54) FAST RSA SIGNATURE VERIFICATION

(75) Inventor: Niels Ferguson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 11/640,796

(22) Filed: Dec. 18, 2006

(65) Prior Publication Data

US 2008/0148055 A1 Jun. 19, 2008

(51) Int. Cl.
*H04L 9/00* (2006.01)
(52) U.S. Cl. ............................ 713/176; 380/28; 380/30
(58) Field of Classification Search ......... 380/277–278, 380/28, 30; 713/168–171, 176–177, 180–181
See application file for complete search history.

(56) References Cited

U.S. PATENT DOCUMENTS

| | | | |
|---|---|---|---|
| 5,218,637 A * | 6/1993 | Angebaud et al. ........... 713/173 |
| 5,493,614 A | 2/1996 | Chaum | |
| 5,613,001 A | 3/1997 | Bakhoum | |
| 5,745,571 A | 4/1998 | Zuk | |
| 5,748,782 A | 5/1998 | Ferreira et al. | |
| 5,910,989 A | 6/1999 | Naccache | |
| 6,446,207 B1 | 9/2002 | Vanstone | |
| 6,499,104 B1 * | 12/2002 | Joux ........................ 713/176 |
| 6,708,893 B2 | 3/2004 | Erfani et al. | |
| 7,036,014 B2 | 4/2006 | Bellare et al. | |
| 7,036,015 B2 | 4/2006 | Vanstone et al. | |
| 7,054,444 B1 | 5/2006 | Paillier | |
| 7,058,808 B1 | 6/2006 | Zolotorev et al. | |
| 2003/0165238 A1 | 9/2003 | Naccache et al. | |
| 2005/0157872 A1 | 7/2005 | Ono et al. | |
| 2006/0140399 A1 | 6/2006 | Young | |

FOREIGN PATENT DOCUMENTS

| | | |
|---|---|---|
| EP | 0549070 | 6/1993 |
| KR | 1020040037555 A | 5/2004 |

OTHER PUBLICATIONS

Bellare, et al., "The One-More-RSA-Inversion Problems and the Security of Chaum's Blind Signature Scheme," Date: 2003, p. 185-215, vol. 16, No. 3, http://www.di.ens.fr/~pointche/Documents/Papers/2003_joc.pdf.
Bos, et al., "Provably Unforgeable Signatures," Date: 1998, http://dsns.csie.notu.edu.tw/researoh/crypto/HTML/PDF/C92/1.PDF#search=%22Provably%20Unforgeable%20Signatures%22.
Soete, et al., "A Signature with Shared Verification Scheme," Date: 1998, p. 253-262, http://dsns.csie.nctu.edu.tw/research/crypto/HTML/PDF/C89/253.PDF#search=%22A%20Signature%20with%20Shared%20Verification%20Scheme%22.

(Continued)

*Primary Examiner*—Hosuk Song

(57) ABSTRACT

An RSA message signature can be verified by verifying that $s^e$ mod n=F(m, n). If a value K, defined as K=$s^e$ div n is computed in advance and provided as an input to the computing device verifying the signature, the signature verification can be significantly faster. To avoid transmission of, and mathematical operations on, large values of K, which can themselves be inefficient, the RSA public exponent e can be selected to be relatively small, such as e=2 or e=3. K is based on publicly available information and can be calculated by the computing device signing the message, or by an intermediate computing device, and transmitted to the device verifying the signature without impacting security.

20 Claims, 5 Drawing Sheets

OTHER PUBLICATIONS

Danial J. Bernstein, "Proving tight security for Rabin-William signatures" Feb. 20, 2007, pp. 1-19.

Danial J. Bernstein, "Proving tight security for Rabin-William signatures" Sep. 26, 2003, pp. 1-13.

Danial J. Bernstein, A secure public-key signature system with extremely fast verification Aug. 2000, pp. 1-11.

"A state-of-the-art public-key signature system",http://cr.yp.to/sigs.html.

"EPO Search Report", Mailed Dec. 2, 2009, Application No. PCT/US2007/085956, Filed Date Jul. 16, 2009, pp. 1-6. (MS# 317473.04).

Quisquater, et al., "Speeding Up Smart Card RSA Computations With Insecure Co-Processors", Selected Papers from the Second International Smart Card 2000 Conference, Jan. 1, 1991, pp. 191-197.

Girault, et al., "Server- Aided Verification: Theory and Practice", Retrieved at << http://www.springerlink.com/content/7njn4r1424848967/>>, Lecture Notes In Computer Science, Advances in Cryptology-Asiacrypt 2005, vol. 3788, Jan. 1, 2005, pp. 605-623.

Lim, et al., "Security and Performance of Server-Aided RSA Computation Protocols", Retrieved at <<http://www. springerlink.com/content/ny670medue52fdaw/ >>, Proceedings of the 15th Annual International Cryptology Conference on Advances in Cryptology, vol. 963, Aug. 27-31, 1995, pp. 70-83.

* cited by examiner

FAST RSA SIGNATURE VERIFICATION

BACKGROUND

Digital signatures are used to digitally prove that signed data was sent by a particular entity. Each entity, such as a computer user, derives a set of data known as a key pair. One key of the pair is known as a public key and can be freely distributed. A second key of the pair is known as a private key and the ability of a digital signature to uniquely identify a particular entity depends on how carefully that entity guards its private key. Any data can be "signed" using the private key. More specifically, the data to be signed and the private key are provided as inputs to known mathematical functions. The output of such functions is the digital signature of the data.

The public key can then be used to verify that the data has not changed since it was signed. More specifically, the signed data, the digital signature, and the public key are provided as inputs to known mathematical functions. If the signed data was modified after it was signed, the mathematical functions will so indicate, generally through an inequality of resulting values that would have been equal but for the modification of the data. Given that only the private key could have generated a signature that will be mathematically verified with the corresponding public key, such a mathematical verification of the signature indicates that the data was not changed since it was signed by someone in possession of the private key. If only one entity possesses the private key, the verification of the signature acts to verify that the data was, in fact, sent by that entity, and that it was not modified during transmission.

One commonly used digital signature algorithm is known as the RSA algorithm, borrowing the first letter of the last names of the three individuals credited with its discovery. An RSA public key comprises a "public exponent" commonly designated by the letter "e" and a modulus commonly designated by the letter "n". An RSA signature "s" of some data, traditionally called a "message" and represented by the variable "m", can be verified by checking that $s^e$ mod n is equal to $F(m,n)$, where "F" is an agreed upon padding function.

As the use of digital communications increases, the number of signed messages will likewise increase. Consequently, the time spent verifying signed messages can be of importance, especially because, while a message needs to be signed only once, its signature can be verified multiple times—once by each recipient. As a result, signature verification is performed many more times than message signing.

With the RSA algorithm, signature verification requires the computation of both $F(m,n)$, where "F" is an agreed upon padding function, and $s^e$ mod n. Of the two expressions, the latter is traditionally more computationally intensive to compute. In fact, $s^e$ mod n is generally evaluated in a piecemeal fashion using individual modular multiplications and modular squaring. To calculate $s^e$ mod n directly, and avoid such a piecemeal approach, would, as is known to those skilled in the art, result in the computation of an $s^e$ term that can be very large, with a resulting loss of performance.

SUMMARY

To verify an RSA signature, a recipient of message data "m" and a signature "s" needs to verify that $s^e$ mod n is equal to $F(m,n)$, where "F" is an agreed upon padding function, and "e" and "n" are elements of an RSA public key corresponding to the signer of the message. However, rather than verifying that the equality is absolutely true, it is mathematically sufficient to verify that $s^e$ mod n is equal to $F(m,n)$ with a probability very close to 1. One mechanism for doing so is to verify that $(s^e$ mod n) mod p is equal to $F(m, n)$ mod p for an appropriately selected value of "p".

By the properties of modulo arithmetic, if a value "K" is defined as $s^e$ div n, then $s^e$ mod n can be expressed as $s^e - Kn$. Substituting this expression into the above modulo p equation yields $(s^e - Kn)$ mod p = $F(m, n)$ mod p. The expression on the left hand side of the equals sign can be computed as $((s$ mod $p)^e - (K$ mod $p)(n$ mod $p))$ mod p. Considering the terms of this expression, the following values will need to be calculated initially: (1) s mod p, (2) K mod p and (3) n mod p. Each of these terms is modulo p and, consequently, results in a relatively small value since p can be selected to be manageably small and any modulo p term must, mathematically, be smaller than p. The remaining computations can all be done modulo p, using individual modular squarings and multiplications to compute the exponentiation.

The value "K" however, remains to be determined. If the exponent "e" is selected to be sufficiently small, such as e=2 or e=3, then the value of K will, likewise, be relatively small, since K is directly proportional to $s^e$. A relatively small value of K enables both a more efficient computation of the K mod p term, and also enables K to be efficiently transmitted. Given that K involves an exponential term, namely $s^e$, it can be computationally expensive to derive a value for K. However, because K can be efficiently transmitted, it can be determined by a computing device other than the one seeking to verify the signature s, and then simply sent to the computing device performing the verification. Of further significance to security considerations, the value K is based entirely on publicly available information, including the signature s, the public exponent e and the modulus n. Thus, sending K does not introduce any decrease in the security of the RSA signature scheme.

In one embodiment, the value K can be calculated by a computing device other than the computing devices receiving the signed message, and can then transmitted to one or more of the computing devices receiving the signed message. For example, the value K can be calculated by the computing device sending and signing the message. The computational cost of calculating K is minimal compared to the computational cost of signing the message itself. Consequently, there is no substantial increase in the work performed by the signing computing device.

In an alternative embodiment, the value K can be computed by a centralized server, such as, for example, an email server charged with distributing copies of the signed message to those computing devices that are clients of the server, or a file server sharing signed data among one or more clients. By calculating K at a central location, each individual signature verification performed by the recipients of the signed message can be made more efficient.

In another alternative embodiment, the computing device receiving the signed message can compute K once and store it with the signed message. Any subsequent signature verifications could then be performed more efficiently by referencing the already calculated value of K.

In yet another alternative embodiment, the public exponent e can be selected to be e=2, using the Rabin variant of the RSA signature scheme. Selecting such a small e provides a relatively small value for K that can be transmitted in an efficient manner, and can be subsequently used by the verifying computing device in an efficient manner. In a still further alternative embodiment, the public exponent e can be selected to be e=3. The value of K can remain relatively small even with e=3, but the disadvantages of the Rabin variant are avoided. In both cases (e=2 and e=3) the padding function F is selected so as to minimize any security degradations due to the selection of a small public exponent.

In a still further alternative embodiment, the value K can be transmitted using existing formats to provide for backwards compatibility. For example, many signatures are encoded in formats that provide for additional fields to be added. The value K can be provided via such additional fields. A receiving computing device that knows to look for such fields can take advantage of the computational efficiencies to be gained by having K pre-computed, while a receiving computing device that has not been updated can still verify the signature and can simply ignore the additional field comprising the value of K. Consequently, K can be provided in a backwards compatible manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
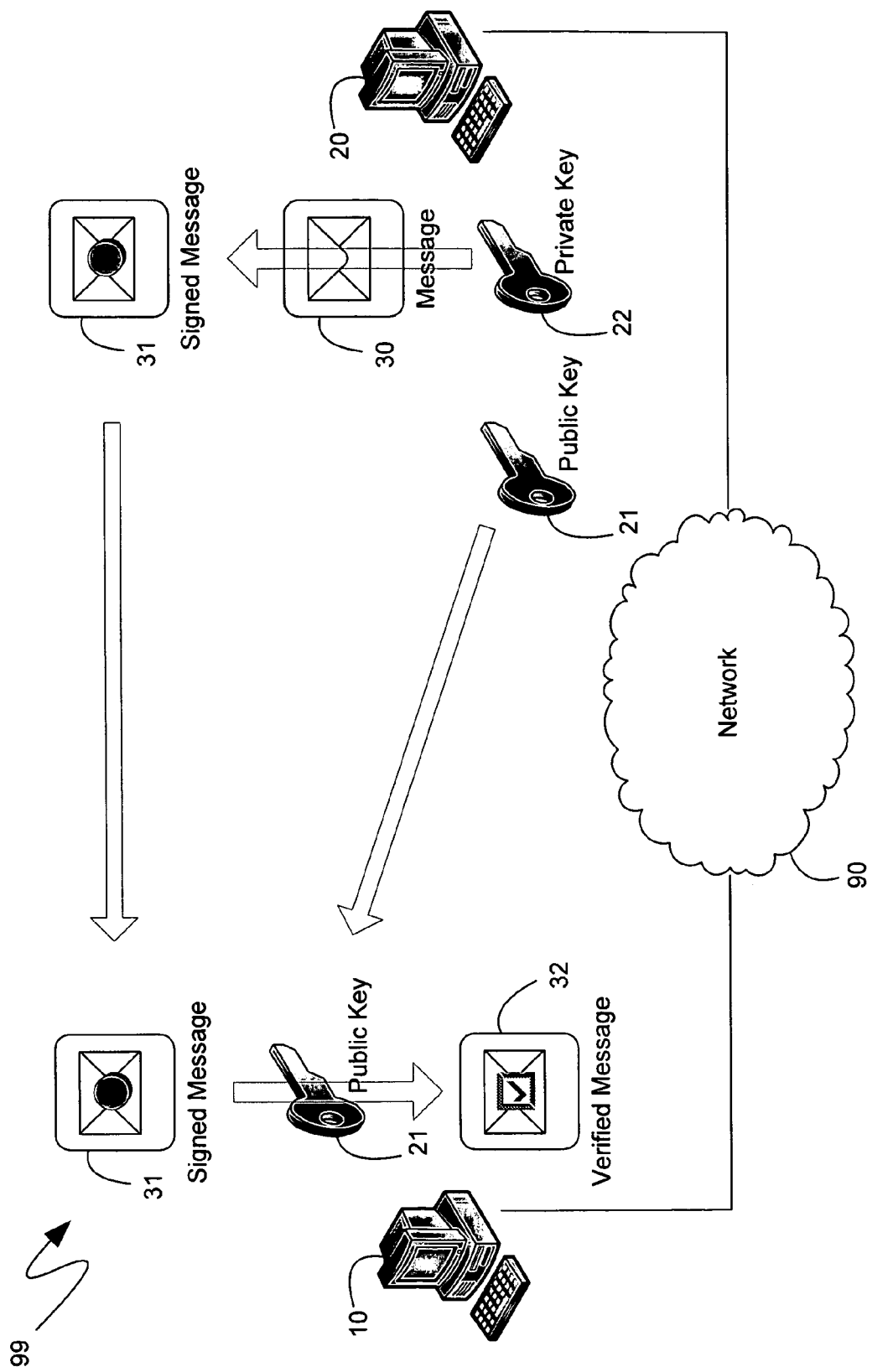
FIG. 1 is a block diagram of a traditional signature scheme.

The following description relates to mechanisms for more efficiently verifying a message signature. An RSA message signature can be verified by verifying that $s^e \bmod n = F(m, n)$, where "s" is the signature, "e" is the exponent from the RSA public key, "n" is the modulus from the RSA public key, "m" is the data that was signed, and the function "F" is an agreed upon padding function. The efficiency with which the equality $s^e \bmod n = F(m, n)$ can be verified increases by an order of magnitude or more if a value K, defined as $K = s^e \text{ div } n$ is computed in advance and provided as an input to the computing device verifying the signature. To avoid transmission of, and mathematical operations on, large values of K, which can themselves be inefficient, the exponent e can be selected to be relatively small, such as e=2 or e=3.

In one embodiment, the value K can be computed by the computing device signing the message and transmitted along with the message and the signature. The computational complexity of computing the value K is far smaller than the computation complexity of computing the signature of a message and, consequently, would not add a substantial computational burden onto the computing device signing the message.

In another embodiment, the value K can be computed by a centralized computing device, such as an email or file server. In one example, an email or file server can compute K upon receiving a signed message and before any clients of the server receive the signed message. By performing the computation of K once in a centralized manner, numerous individual verifications of the signature can be rendered more efficient, substantially offsetting the additional computation effort of the server computing device.

In yet another embodiment a computer receiving the message and signature can compute K once and store it for use in subsequent signature verifications. For ease of access, K can be stored on the receiving computer such that it is co-located with the message and signature.

In a still further embodiment, the value of the public exponent e can be selected to be 2 so as to provide for a relatively small value of K that can be efficiently transmitted and efficiently used by the computing device verifying the signature. In a still further embodiment, the value of the public exponent e can be selected to be 3 so as to provide for additional security while keeping the value of K relatively small. Using e=2 or e=3 requires an appropriately selected padding function F that properly randomizes all the bits in the result.

The techniques described herein focus on, but are not limited to, the verification of an RSA signature by using a pre-computed value K to render the verification more efficient. The value K can be computed by any number of computing devices, as will be shown. Furthermore, given an appropriate selection of the public exponent e, and given that the verification of a signature need not require infinite accuracy, the verification described can be an order of magnitude or more faster than conventional RSA signature verifications.

Turning to FIG. 1, an exemplary system 99 is illustrated, comprising, in part, a sending computing device 20 and a receiving computing device 10, the two computing devices being connected via a network 90. The sending computer 20 can generate two keys: a public key 21 and a private key 22. The generation of the keys proceeds in a manner known to those skilled in the art, such as in accordance with the ubiquitous RSA algorithm, or the Rabin variant of the RSA algorithm. The public key 21 is so-called because it is intended to be freely distributed and is used by recipients, such as the receiving computing device 10, to verify the signature of messages signed with the private key 22.

A message 30 can be generated by the sending computing device 20 and can comprise any collection of data that the sending computing device wishes to transmit. A message 30 can, for example, be an email message, but it is not so limited. The message 30 can likewise be a file, a component, a module or any other collection of data that is being sent by the sending commuting device 20.

Prior to sending the message 30, the computing device can generate a signed message 31 using the private key 22 in a manner known to those skilled in the art, such as in the manner described by the RSA algorithm. The private key 22 is used to sign the message 30 in such a manner that the signature of the signed message can be verified using the message data, the signature itself, and information contained within the public key 21. More specifically, the private key 22 is used to generate a signature, represented by the variable "s", based on the data of the message 30, represented by the variable "m", such that s satisfies the equation $s^e \bmod n = F(m, n)$, where both n and e are part of the public key 21.

Once the signed message 31, comprising both the message data and the signature, has been generated by the computing device 20, it can be transmitted to the computing device 10, such as through the network 90. The computing device 10 can verify the signature of the signed message 31 by verifying that the signature satisfies the equation $s^e$ mod n=F(m, n). If the signature satisfies the equation, then it is very likely that the message data received is the same message data that was sent by the sending computing device 20, and it is further very likely that the sending computing device 20, or more appropriately the user of the sending computing device, was the sender of the message, since that user should be the only one who has access to the private key 22, and the private key is required to generate the signature that satisfies the equation $s^e$ mod n=F(m, n). Thus, the receiving computing device 10, by verifying the signature of the signed message 31, receives a digital assurance that the content of the message was indeed sent by the its purported sender.

As shown in FIG. 1, to verify that $s^e$ mod n=F(m, n), the receiving computing device 10 obtains the values for the signature s and the message data m from the signed message 31, and obtains the values for n and e from the public key 21. Thus, as illustrated, the receiving computing device 10 uses the public key 21 to verify the signed message 31. While illustrated as a separate message, the verified message 32 can be nothing more than simply the signed message 31 in combination with the knowledge that the signature of the signed message has been verified.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals or optical signals, such as quanta of light, representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

Figure 2:
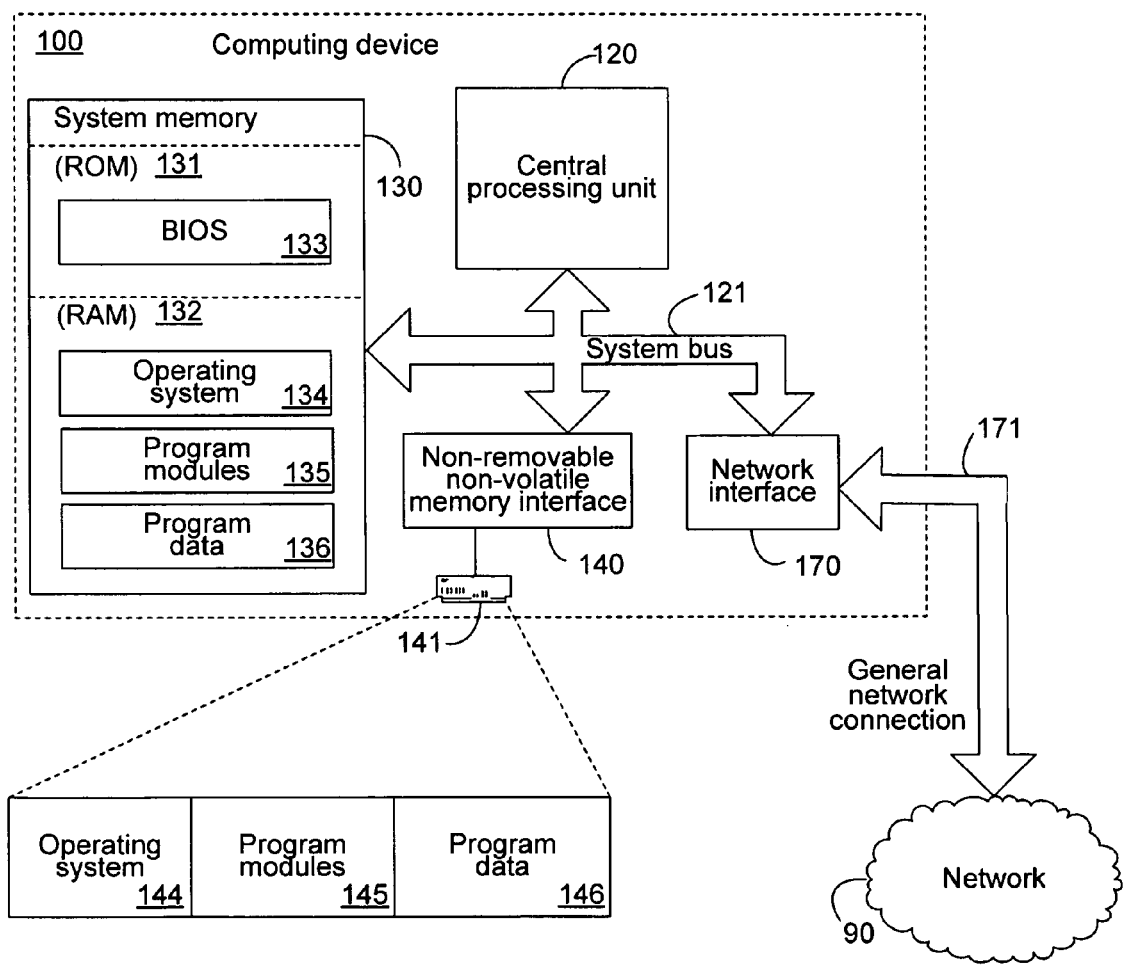
FIG. 2 is a block diagram of an exemplary computing device.

With reference to FIG. 2, an exemplary computing device 100 is illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link may be used.

Returning again to the verification of a signature, the computation of $s^e$ mod n, F(m, n) and the determination of their equality requires the performance of specific mathematical functions by the CPU 120, in combination with the system memory 130. As will be known by those skilled in the art, the value of the term $s^e$ can be very large. Consequently, the computation of $s^e$ mod n is performed incrementally using individual modular squarings and modular multiplications, as opposed to calculating the $s^e$ term first and then calculating the modulo n of it. More specifically, the incremental computation of $s^e$ mod n proceeds by first calculating ($s^2$ mod n), then taking the modulo n of the result, then possibly multiplying the result by s, then taking the modulo n of that result, then squaring the result, then taking the modulo n of the result and so forth. For large values of e, such as the commonly used e=65537, the computation of $s^e$ mod n can be fairly time consuming and can be far more computationally expensive than the calculation of the F(m, n) term. In other words, the time required to verify that $s^e$ mod n=F(m, n) is mostly spent computing the $s^e$ mod n term.

As explained previously, the variable "m" represents the data of message 30 and the variable "s" represents the signature generated for the message 30 to create signed message 31. The terms represented by the variables "n" and "e" are obtained from the public key 21. More specifically, the generation of the public key 21 and the private key 22 entails the selection of two random numbers, which are multiplied together to produce a large random number that becomes the value "n" and is known as the "modulus" of the public key 21 and the private key 22. The variable "e" is the "public exponent" and is selected in combination with a private exponent in a manner known to those skilled in the art. The public exponent e, in combination with the modulus n comprise the public key 21, while the private key 22 comprises the modulus n in combination with the private exponent.

Rather than absolutely verifying that $s^e$ mod n is equal to F(m, n), a signature can be verified if it can be shown, mathematically, that the probability that $s^e$ mod n is equal to F(m, n) is very high. One mechanism for doing so is to verify the equation $s^e$ mod n=F(m, n) modulo a relatively small value p. By the properties of modulo arithmetic, if ($s^e$ mod n) mod p is equal to F(m, n) mod p, then either $s^e$ mod n=F(m, n) or $s^e$ mod n is exactly within a multiple of p of F(m, n). As a simple example, assume p=3, and $s^e$ mod n=16 and F(m, n)=16. As can be seen, $s^e$ mod n=F(m, n), but consider the effect of calculating ($s^e$ mod n) mod p and F(m, n) mod p. In each case the result would be 1, since 16 divided by 3 yields a divisor of 5 and a remainder of 1. However, ($s^e$ mod n) mod p would also equal 1 if $s^e$ mod n was equal to 19 or 22, or any other value obtained by adding or subtracting a multiple of 3 from 16.

Thus, if ($s^e$ mod n) mod p is equal to F(m, n) mod p, then either $s^e$ mod n=F(m, n) or $s^e$ mod n is exactly within a multiple of p of F(m, n).

Of course, as is obvious to those skilled in the art, the values of $s^e$ mod n and F(m, n) are not mere two digit numbers, but rather are very large numbers that are hundreds of digits long. Consequently, random values for p can be selected from among a set of particular, sufficiently large values, such that the verification that ($s^e$ mod n) mod p is equal to F(m, n) mod p can prove, with a very high certainty, that $s^e$ mod n=F(m, n).

The calculation of ($s^e$ mod n) mod p, however, still faces the task of calculating an exponential term, which can be, as shown above, computationally expensive. However, by the properties of modulo arithmetic, given any divisor, any number can be expressed as a multiple of the divisor plus some remainder that is less than the divisor. Again, considering the simple example above, the number 16 can be expressed as the fifth multiple of 3 (namely 15) plus a remainder of 1. Consequently the remainder given by the term $s^e$ mod n can be expressed as the original $s^e$ minus some multiple of the divisor n. Mathematically, this can be expressed as $s^e$ mod n=$s^e$−($s^e$ div n)n. If a value "K" is defined to equal $s^e$ div n, then this equation becomes $s^e$ mod n=$s^e$−Kn.

Replacing $s^e$ mod n with $s^e$−Kn in the above modulo p formula yields: ($s^e$−Kn) mod p=F(m, n) mod p. By the properties of modulo arithmetic, the term to the left of the equals sign can be expanded and the equation can be rewritten as: ((s mod p)$^e$−(K mod p)(n mod p)) mod p=F(m, n) mod p. The value of the left hand side is dependent upon: (1) s mod p, (2) K mod p and (3) n mod p. Each of these terms is modulo p and, consequently, results in a relatively small value, since p can be selected to be manageably small and any modulo p term must, mathematically, be smaller than p. Furthermore, the exponential term (s mod p)$^e$ can be computed fairly efficiently using squarings and multiplications modulo p. This ensures that the values being used in the computation remain small and thus that the computations are relatively efficient.

As indicated previously, p can be selected randomly from among a set of particular, sufficiently large values. In one embodiment, the set of particular values can be a set of primes. To ensure that the primes from which p is being selected are sufficiently large, 128-bit or larger primes can be used. In an alternative embodiment, p can be selected to be the product of two primes $p_1$ and $p_2$, each of which can be 64-bits long. As will be shown, one advantage to selecting p in such a manner is that the required computations can be performed once modulo $p_1$ and once modulo $p_2$, where each computation can be especially efficient using modern 64-bit processors. In yet other embodiments p can be selected randomly in a particular range, as the product of three or more primes, or from a set of numbers that does not include any "smooth" numbers that are the product of only small primes.

Figure 3:
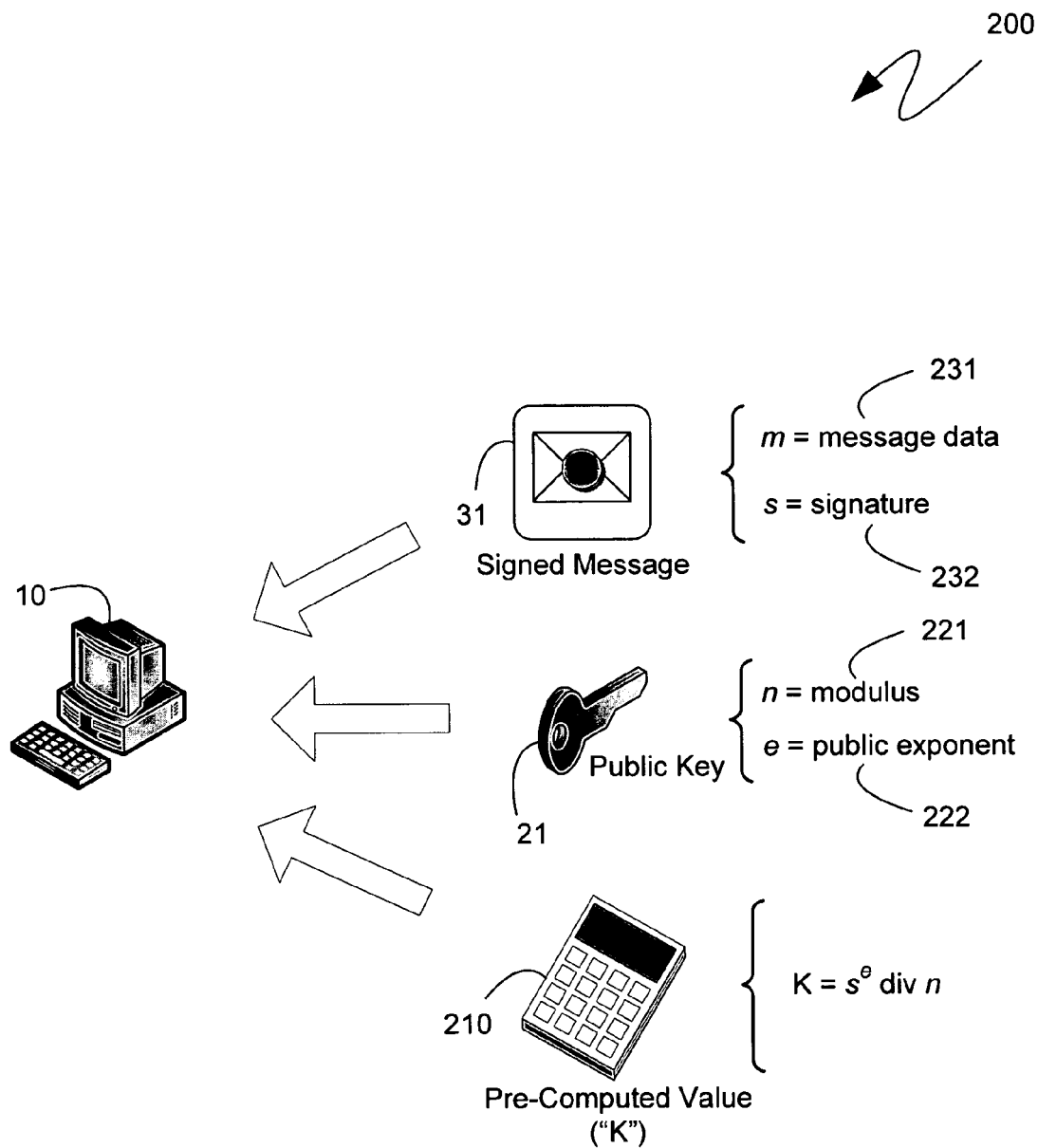
FIG. 3 is a block diagram illustrating the elements received by a computing device performing a verification of a signature.

Turning to FIG. 3, an exemplary environment 200 is shown comprising the receiving computing device 10 and a signed message 31, a public key 21 and a pre-computed value K 210. As will be shown, if the receiving computing device 10 receives the pre-computed value K 210, it can more efficiently verify the signature s 232, which, as shown in FIG. 3, is a component of the signed message 31, as is the message data m 231. Likewise shown in FIG. 3 are the components of the public key 21, namely the modulus n 221 and the public exponent e 222.

In one embodiment, the pre-computed value K 210 can be provided to the receiving computing device 10 via backwards compatible mechanisms. Many signatures, such as signature s 232, are provided with the signed message 31 in an encoded format that provides for additional fields to be added.

Examples of such formats, commonly used to provide signatures, include formats conforming to the ASN.1 standard or the XML standard. The provision of signatures using such extensible formats enables the addition of a new field that can comprise the pre-computed value K 210. If the receiving computing device 10 comprises updated validating software, such updated software can parse the signature s 232, identify the new field, extract the pre-computed value K 210, and proceed to verify the signature using the more efficient mechanisms described herein. On the other hand, if the receiving computing device 10 comprises legacy validating software, such legacy software can still obtain the signature s 232 and can simply ignore the new field comprising the pre-computed value K 210. In such a case, the legacy validating software can simply validate the signature s 232 by verifying $s^e \mod n = F(m, n)$ in accordance with known, less efficient, mechanisms.

If the pre-computed value K 210 is provided in such a backwards compatible manner, it would be provided as part of the signature s 232, and thereby as part of the signed message 31k, and not independently as shown in FIG. 3. In an alternative embodiment, however, the pre-computed value K 210 can be provided independently, as illustrated in FIG. 3, thereby enabling any computing device to pre-compute K without requiring such a computing device to parse the signature s 232.

As can be seen from FIG. 3, the pre-computed value K 210 is based only on the values of s, e and n, each of which was already present in either the signed message 31 or the public key 21. Consequently, there is no additional security risk in providing the pre-computed value K 210 to the receiving computing device 10, since K contains no additional information than was already present in the signed message 31 and the public key 21. Likewise, there is no additional security risk in computing the value K 210 on a computing device different from the receiving computing device 10.

However, the pre-computed value K 210 is, as previously indicated, directly proportional to the term $s^e$. For large values of e, the value of K will likewise be large. Such a large K may not be efficient to transmit and, potentially more importantly, such a large K may not be efficient for the receiving computing device 10 to use in computing the (K mod p) term to verify the signature s 232. To maintain an appropriately sized K value, the public exponent e 222 can be selected to be a small value, such as 2 or 3. If e=2 is used, the resulting calculations performed by the computing device 10 can be very efficient. However, using e=2 has some disadvantages, as is well known to those skilled in the arts. These disadvantages can be avoided by selecting e=3, in combination with an appropriate function F(m, n). As will be known to those skilled in the art, e=3 may provide less security if F(m, n) does not sufficiently randomize, or more accurately pseudo-randomize, the bits of the result. However, a properly selected F(m, n), which does randomize the bits of the result can provide adequate security with e=3.

As indicated previously, the signature s 232 can be verified by verifying that $((s \mod p)^e - (K \mod p)(n \mod p)) \mod p = F(m, n) \mod p$. Consequently, to evaluate the expression to the left of the equals sign, the computing device 10 can determine: (1) s mod p, (2) K mod p and (3) n mod p. If p is formed as a product of two 64-bit numbers $p_1$ and $p_2$, then the computing device 10 can determine: (1) s mod $p_1$, (2) s mod $p_2$, (3) K mod $p_1$, (4) K mod $p_2$, (5) n mod $p_1$ and (6) n mod $p_2$. As will be known by those skilled in the art, the computation of s mod $p_1$ can require approximately 32 elementary multiplications of 64×64 bits assuming that n is 2048 bits long. For e=3, K can be twice as long as s and, consequently, the computation of K mod $p_1$ can require 64 elementary multiplications of 64×64 bits. Lastly, n mod $p_1$ can likewise require 32 elementary multiplications. Since each of these terms modulo $p_2$ can require a like number of elementary multiplications, the entire computation of $((s \mod p)^e - (K \mod p)(n \mod p)) \mod p$, where p is the product of two 64-bit numbers $p_1$ and $p_2$, can require as little as 256 elementary multiplications on a 64-bit processor, plus a few additional operations. By comparison, the computation of $s^e \mod n$, with all of the variables the same as in the above example, can require approximately 3000-4000 elementary multiplications. Consequently, by obtaining the pre-computed value K 210 from an external source, and selecting e=2 or e=3, together with an appropriately sized p, the computations described can be over ten times faster than conventional signature verification.

Figure 4:
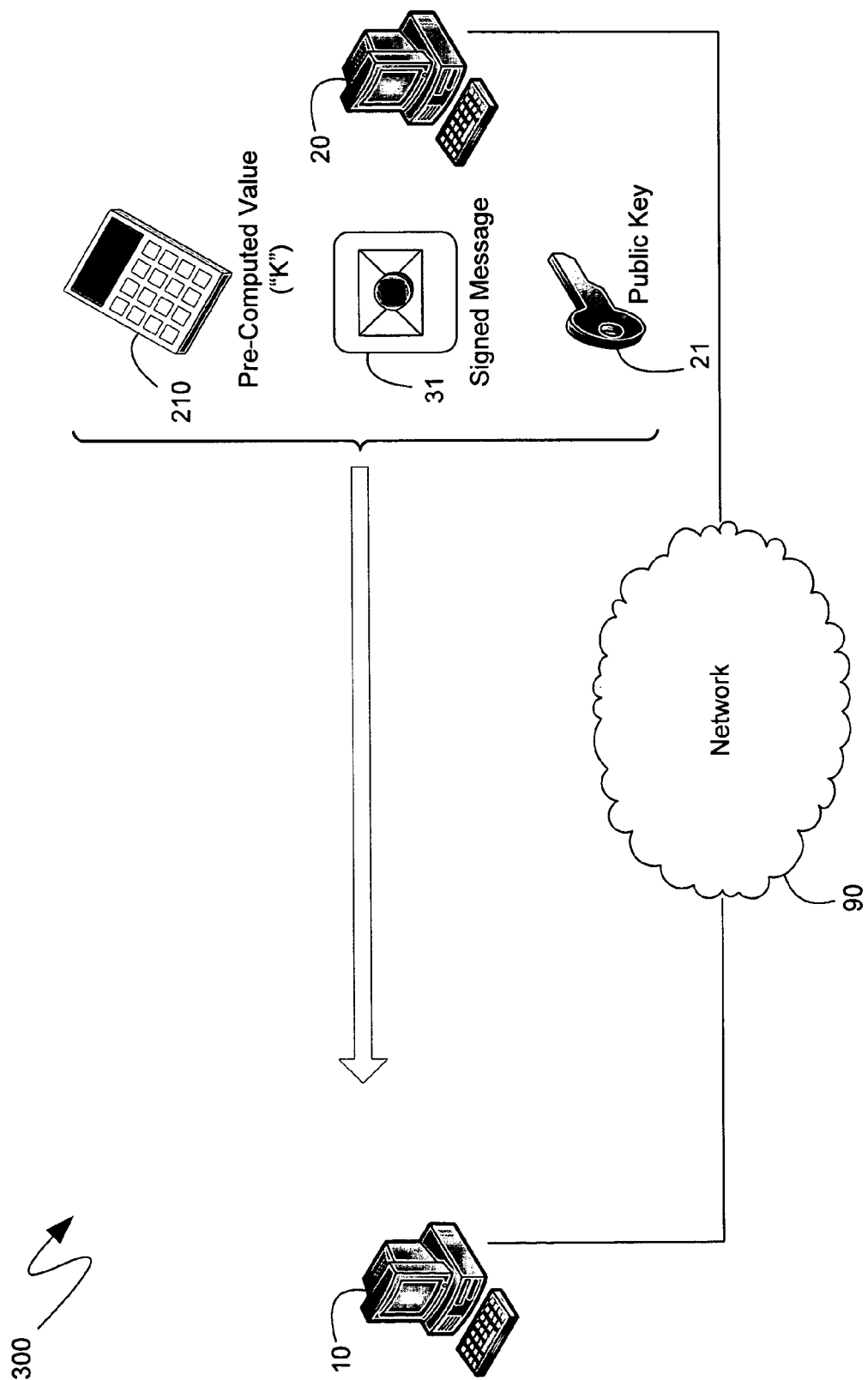
FIG. 4 is a block diagram illustrating the transmission of elements to a computing device according to one embodiment.

Turning to FIG. 4, an exemplary environment 300 according to one embodiment is illustrated. As shown, the sending computing device 20 computes, not only the relevant signature s 232 to create the signed message 31, but also the pre-computed value K 210. As will be recognized by those skilled in the art, the computation of the pre-computed value K 210 is minimal compared to the computation of the signature s 232. Consequently, while the receiving computing device 10 can verify the signature s 232 as much as ten times more efficiently if it receives the pre-computed value K 210 from an external source, the sending computing device 20 suffers no corresponding performance penalty in calculating the pre-computed value K 210 along with the calculation of the signature s 232. Thus, in one embodiment, illustrated in FIG. 4, the sending computing device 20 can provide the pre-computed value K 210 to the receiving computing device 10.

Figure 5:
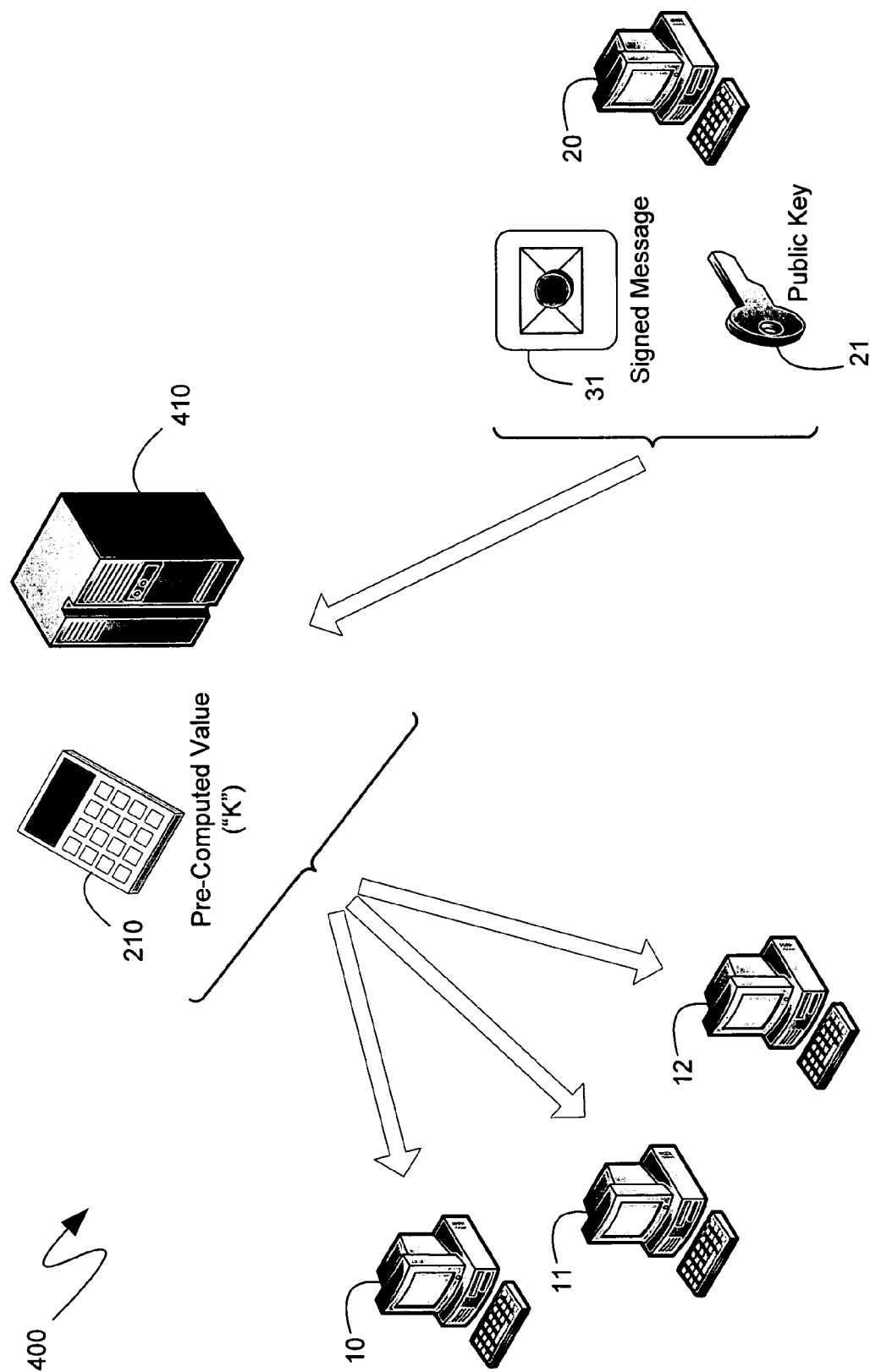
FIG. 5 is a block diagram illustrating the transmission of elements to a computing device according to another embodiment.

Turning to FIG. 5, an exemplary environment 400 according to an alternative embodiment is illustrated. As shown, the sending computing device 20 signs the message to create the signed message 31 and does not need to possess the ability to compute the pre-computed value K 210. Instead, the pre-computed value K 210 can be calculated by an intermediate computing device, such as the server computing device 410. In one embodiment, the server computing device 410 can insert the pre-computed value K 210 into a new field in the manner described above to provide for backwards compatibility. Alternatively, the server computing device 410 can merely append the pre-computed value K 210 onto the signed message 31. In either case, the single computation of the pre-computed value K 210 by the server computing device 410 can provide a factor of ten efficiency in the verification of the signature s 232, which will be performed individually by each recipient of the signed message 31, such as computing devices 10, 11 and 12, each of which are illustrated as acting as clients of the server computing device 410. Consequently, any increase in computation experienced by the server computing device 410 in calculating the pre-computed value K 210, can be more than offset by the attendant increase in computational efficiency experienced by each of the computing devices 10, 11 and 12 receiving the signed message 31 when they attempt to verify the signature s 232.

While each of the embodiments illustrated in FIGS. 4 and 5, and described above focus on the delivery of the signed message 31, the public key 21 and pre-computed value K 210 from one or more external computing devices, an alternative embodiment contemplates different components of the same computing device acting as the sender and receiver. For example one application on a computing device can send a signed message 31, including the pre-computed value K 210, and another application on the same computing device can receive and verify the signature. Put differently, the former application acts as computing device 20 of FIG. 4, while the latter application acts as computing device 10 of FIG. 4.

Analogously, with respect to FIG. 5, one application on a computing device can act as the central server 410 and can determine the pre-computed value K 210 for one or more other applications on the same computing device that may have need of K. In one exemplary embodiment, the signed message 31, whether received via intra-computing device communication or inter-computing device communication, is stored with the pre-computed value K 210 for later use on the receiving computing device. Thus, the former application determines the pre-computed value K 210 for the latter applications and can further facilitate the storage of K such that it is associated with, and optionally co-located with, the signed message 31. In another embodiment, the receiving computing device, such as computing device 10, need not have a specific application for determining the pre-computed value K 210 and instead can use whatever application it would normally use, except that the determined value of K would be saved and associated with, and optionally co-located with, the signed message 31. In such a case, subsequent verifications of the signature 232 can become more efficient.

In yet another embodiment the signature 232 comprises not only of the value s, but also one or more additional values t which can be used as input to the padding function F. When signing the message 30, the signer can generate an appropriate value t and compute a value s such that $s^e$ mod n=F(m, n, t). The signature can now comprise both the value s, and the value t. The pre-computed value K 210 can be computed as described in detail above. The verifier of the new signature comprising both s and t can extract t for use as an additional input to F, and can extract s to verify the signature in the same manner as described in detail above.

As can be seen from the above descriptions, the provision of specific pre-computed information to a computing device seeking to verify a signature can provide a factor of ten or more decrease in the computational effort required to verify such a signature. In view of the many possible variations of the subject matter described herein, we claim as our invention all such embodiments as may come within the scope of the following claims and equivalents thereto.

I claim:

1. One or more computer-readable media comprising computer-executable instructions for verifying a signature, the computer-executable instructions directed to steps comprising:
   receiving a signed message comprising message data and the signature, the signed message having been signed using a private key comprising a modulo value, the private key being paired with a public key comprising a public exponent and the modulo value;
   receiving a pre-computed value corresponding to a quotient of the signature raised by the public exponent then divided by the modulo value; and
   using the pre-computed value to verify the signature.

2. The computer-readable media of claim 1, wherein the signed message further comprises an additional signature value, and wherein the computer-executable instructions directed to using the pre-computed value to verify the signature further comprise computer-executable instructions directed to using the pre-computed value and the additional signature value to verify the signature.

3. The computer-readable media of claim 1, wherein the public exponent has a value of three.

4. The computer-readable media of claim 1, wherein the signed message and the pre-computed value originate at a sending computing device.

5. The computer-readable media of claim 1, wherein the signed message and the pre-computed value originate at different computing devices.

6. The computer-readable media of claim 1, wherein the pre-computed value and the signature are encoded using a signature record.

7. The computer-readable media of claim 1, wherein the pre-computed value is indefinitely retained beyond the verification of the signature.

8. One or more computer-readable media comprising computer-executable instructions for aiding in the verification of a signature, the computer-executable instructions directed to steps comprising:
   transmitting a signed message comprising message data and the signature, the signed message having been signed using a private key comprising a modulo value, the private key being paired with a public key comprising a public exponent and the modulo value;
   generating a pre-computed value corresponding to a quotient of the signature raised by the public exponent then divided by the modulo value; and
   transmitting the pre-computed value.

9. The computer-readable media of claim 8 comprising further computer-executable instructions directed to steps comprising: generating the signed message.

10. The computer-readable media of claim 8, wherein the signed message further comprises an additional signature value required to verify the signature.

11. The computer-readable media of claim 8, wherein the public exponent has a value of three.

12. The computer-readable media of claim 8, comprising further computer-executable instructions directed to steps comprising: encoding the pre-computed value and the signature using a signature record.

13. The computer-readable media of claim 12, wherein encoding the pre-computed value comprises encoding the pre-computed value using an extra field of the signature record.

14. A method of verifying a signature comprising:
   receiving a signed message comprising message data and the signature, the signed message having been signed using a private key comprising a modulo value, the private key being paired with a public key comprising a public exponent and the modulo value;
   receiving a pre-computed value corresponding to a quotient of the signature raised by the public exponent then divided by the modulo value; and
   using the pre-computed value to verify the signature.

15. The method of claim 14, further comprising: receiving an additional signature value, wherein the using the pre-computed value to verify the signature further comprises using the pre-computed value and the additional signature value to verify the signature.

16. The method of claim 14, wherein the public exponent has a value of three.

17. The method of claim 14, wherein the signed message and the pre-computed value originate at a sending computing device.

18. The method of claim 14, wherein the signed message and the pre-computed value originate at different computing devices.

19. The method of claim 14, wherein the pre-computed value and the signature are encoded using a signature record.

20. The method of claim 14, wherein the pre-computed value is indefinitely retained beyond the verification of the signature.

* * * * *